United States Patent [19]
Dobler et al.

[11] Patent Number: 6,023,220
[45] Date of Patent: Feb. 8, 2000

[54] VEHICLE HAVING A SCANNING SYSTEM

[75] Inventors: Guenter Dobler, Altbach; Siegfried Rothe, Denkendorf, both of Germany

[73] Assignee: DaimlerChrysler AG, Germany

[21] Appl. No.: 09/087,983

[22] Filed: Jun. 1, 1998

[30] Foreign Application Priority Data

May 30, 1997 [DE] Germany ............................ 197 22 829

[51] Int. Cl.⁷ ............................................... B60Q 1/00
[52] U.S. Cl. ........................ 340/440; 340/429; 280/5.51; 280/5.512
[58] Field of Search .................................. 340/435, 436, 340/429, 440, 903, 905, 936, 937, 938, 939, 942, 943, 425.5; 362/466, 467, 475; 280/5.506, 5.51, 5.512

[56] References Cited

U.S. PATENT DOCUMENTS

| | | | |
|---|---|---|---|
| 4,765,649 | 8/1988 | Ikemoto et al. | 280/5.51 |
| 4,834,531 | 5/1989 | Ward | 356/5.08 |
| 4,868,720 | 9/1989 | Miyauchi et al. | 362/69 |
| 5,076,384 | 12/1991 | Wada et al. | 340/943 |
| 5,165,838 | 11/1992 | Kallansrude et al. | 414/471 |
| 5,510,889 | 4/1996 | Herr | 356/5.1 |
| 5,568,137 | 10/1996 | Liu | 340/905 |
| 5,790,243 | 8/1998 | Herr | 356/5.1 |

FOREIGN PATENT DOCUMENTS

| | | | |
|---|---|---|---|
| 44 11 125 | 10/1994 | Germany . | |
| 195 07 957 | 7/1995 | Germany . | |
| 195 07 957 | 9/1996 | Germany | 340/942 |
| 02182549 | 7/1990 | Japan . | |
| 05058363 | 3/1993 | Japan . | |
| 5-272984 | 10/1993 | Japan . | |
| 6-36187 | 2/1994 | Japan . | |
| 7-49 223 | 2/1995 | Japan . | |
| 8-210828 | 8/1996 | Japan . | |
| 8-210905 | 8/1996 | Japan . | |
| 8-263800 | 10/1996 | Japan . | |
| 10-11580 | 1/1998 | Japan . | |
| 10-73538 | 3/1998 | Japan . | |

*Primary Examiner*—Jeffery A. Hofsass
*Assistant Examiner*—Van T. Trieu
*Attorney, Agent, or Firm*—Evenson, McKeown, Edwards & Lenahan, P.L.L.C.

[57] ABSTRACT

A vehicle having a scanning system for zero contact scanning of one or several mutually spaced road areas and having an analyzing system connected behind the scanning system. The analyzing unit is equipped for determining the roll-over angle, the roll-over moment, the vehicle load condition and/or the road condition via measured data detected and supplied by the scanning system. The resulting data is particularly suitable for the early determination of dangerous influences on the driving dynamics of a vehicle.

16 Claims, 3 Drawing Sheets

VEHICLE HAVING A SCANNING SYSTEM

This application claims the priority of German patent 19722829.1–32, filed May 30, 1997, the disclosure of which is expressly incorporated by reference herein.

The invention relates to a vehicle having a scanning system for zero contact scanning of one or several mutually spaced road areas and having an analyzing system connected to the scanning system.

German Patent Document DE 195 07 957 C1 discloses the above-mentioned type of vehicle. In the vehicle taught therein, the scanning system comprises one or several optical scanning devices which have several infrared-light transmitting elements and a respective CCD-array. The system suggested in this patent scans the road surface in order to determine the distance of a respective road boundary, a contour and/or a contrast measurement and to keep the vehicle in a certain driving lane. In particular, according to this patent, the contours and reflection characteristics of the driving lane or road boundary devices must be detected. In addition, with a corresponding lay-out, this system permits the monitoring of the environment surrounding the vehicle for possible obstacles.

From German Patent Document DE 44 11 125 C2, a traffic information system is known which consists of at least one transmitting and receiving unit in a respective vehicle and several passive return transmitters (so-called transponders) which are arranged along a driving route. Stored in the transponders is route-related static information (concerning the driving route) and the road arrangement or the traffic routing. This information is supplied to a transmitting/receiving unit after activation via a radiation pulse and can be subsequently used by an on-board computer to influence or control the vehicle transmission line.

It is an object of the present invention to provide a vehicle of the initially mentioned type in which, at relatively low expenditures, a reliable detection is possible of influencing variables which are important with respect to the driving dynamics of the vehicle.

This and other objectives and advantages are achieved by providing a vehicle with a scanning system according to the invention, in which measured data are obtained, from which the spatial position of the vehicle can be determined along with, in particular, the roll-over angle with respect to the road. Additionally, the condition of the road can be detected by the scanning system.

The scanning system can be implemented, for example, using combinations of optical or acoustic transmitters/receivers. By determinating the roll-over angle, for example, the overturning moment which acts on the vehicle can be detected at any driving speed. In addition, conclusions can be drawn based on load distributions and, via additional measurable variables, on the overall loading of the vehicle.

In an embodiment of the present invention, a very simple arrangement of scanning units is included for detecting measurable data. This data is suitable for determining the roll-over angle and/or overturning moment for the vehicle.

Another embodiment of the invention includes an arrangement of scanning units which acquire measurable data from which conclusions can be drawn, concerning the vehicle's position, relative to the road, and hence the loading of the vehicle. For this purpose, the distance to the road is determined at a minimum of three points, where each point is not situated on a straight line.

In still another embodiment of the present invention, the data determined by the scanning system is used for determining limit values with respect to driving dynamics as a function thereof. For safety reasons, the limit values should not be exceeded. The emission of corresponding information signals allows the vehicle driver to adapt his vehicle's handling to a situation that is determined to be dangerous.

In a further advantageous embodiment of the present, the scanning system may be formed by one or several optical scanning units which scan in a line-type manner and which consist of an infrared (IR) transmitting element line and a CCD-array or of a photodiode or phototransistor line.

Other objects, advantages and novel features of the present invention will become apparent from the following detailed description of the invention when considered in conjunction with the accompanying drawings.

DETAILED DESCRIPTION OF THE DRAWINGS

Figure 1:
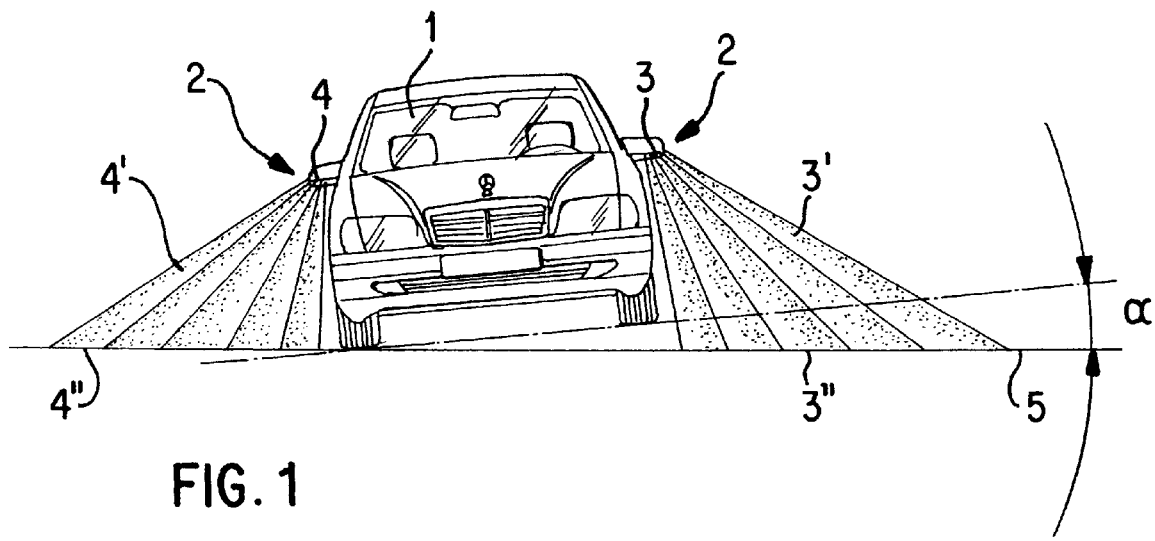
FIG. 1 is a frontal view of a passenger car having one optical scanning unit on both sides of the vehicle which is integrated in an outside mirror.

The passenger car 1 illustrated in FIG. 1 is equipped with an optical scanning system 2 which has a scanning unit 3 integrated in the left outside mirror of the passenger car and a scanning unit 4 integrated in the right outside mirror thereof. Both scanning units 3, 4 have a uniform grid of several IR-light transmitters and respective receivers. The scanning units 3, 4 have radiation and scanning ranges 3', 4'. Each of these radiation and scanning ranges 3', 4' have a scanning range of, for example, approximately one meter and are represented in an ideal manner.

The scanning units which can be used are of the type taught in the above-mentioned German Patent Document DE 195 07 C1, for example. In particular, in the case of these scanning units, the receivers are formed by respective CCD-arrays with, for example, 64 scanning elements. As an alternative, other light sensors can be used as receivers which scan in a line-type manner (e.g., a line of 12 photodiodes or phototransistors, or a different number of photodiodes or phototransistors). The two scanning units 3, 4 transmit their information signals to a central analyzing unit (not shown) which receives, analyzes and processes these signals.

The two scanning units 3, 4 radiate IR-light on one lateral road area 3" and 4", respectively, and scan this area. Here, transit time measurements, which are known per se, can be implemented via the reflected IR-light rays. On the one hand, this makes it possible to detect the distances between the left vehicle-fixed scanning unit 3 and the respective road area 3" and on the other hand to detect distances between the right scanning unit 4 (also fixed to the vehicle) and the respective road area 4". In this case, both distances are detected via the analyzing unit. From the measured distance data, the geometry of the vehicle and optional additional data (for example, the various tire pressures, the vehicle roll-over angle α of with respect to the road 5) can be determined. Further, the analyzing unit is capable, while appropriately taking into account additional information, of calculating the roll-over or overturning moment that is affecting the vehicle. Examples of additional date are, the mass distribution or the load condition of the vehicle 1, the driving speed, the roll-over angle rate and the absolute inclination of the road.

The result from the analysis of the measured data obtained by the scanning system is processed by the analyzing unit such that, as a function of the roll angle and/or the overturning or roll-over moment which acts on the vehicle, limit values are determined for the speed and the acceleration of the vehicle. When these limit values are exceeded, optical, acoustic or haptic warning signals are emitted to the driver. In this case, the limit values are expediently additionally selected as a function of whether straight-ahead driving or cornering is involved, and optionally at what cornering radius or what lateral acceleration. In addition, it is possible to transmit the information signals of the analyzing unit to a central engine control which can automatically limit the engine power, the vehicle speed and/or the vehicle acceleration. In this manner, sufficient directional control can also be ensured in situations with respect to driving dynamics. Additionally, in particular, an effective protection against the vehicle rolling over can be ensured.

Figure 2:
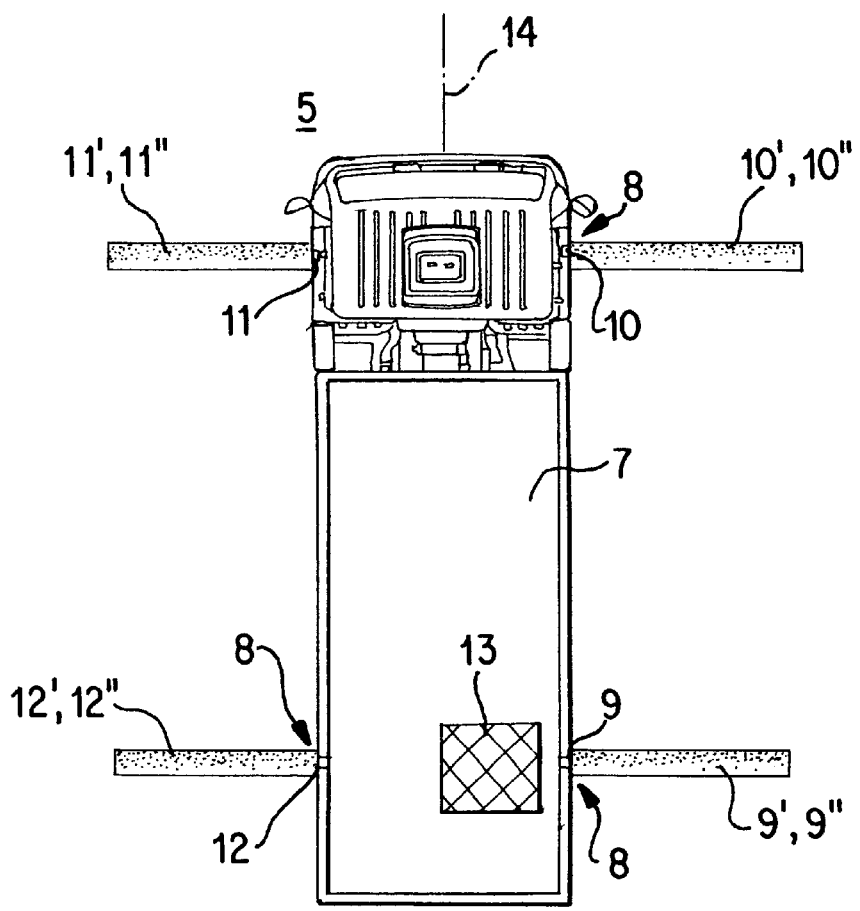
FIG. 2 is a schematic top view of a truck having four scanning units arranged on the sides of the vehicle.

FIG. 2 illustrates a truck 7 with an optical scanning system 8 which comprises four scanning units 9, 10, 11, 12 as well as an analyzing unit (not shown). The scanning unit 9 is arranged on a rearward right vehicle side area. The scanning unit 10 is arranged on a forward right vehicle side area. The scanning unit 11 is arranged on a forward left vehicle side area. The scanning unit 12 is arranged on a rearward left vehicle side area.

Figure 3:
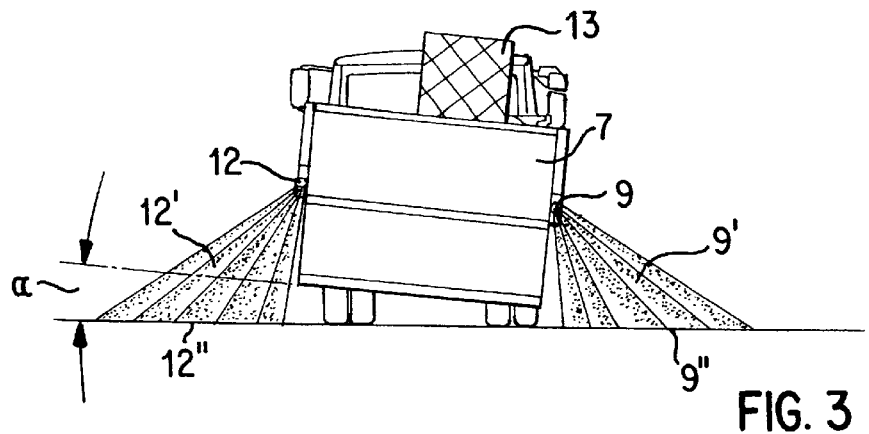
FIG. 3 is a schematic rear view of the truck of FIG. 2 for illustrating determination of a load condition.

FIG. 3 is a view of the truck 7 from the rear in the direction that the vehicle is being driven. Illustrated as an example, a cargo load 13 is arranged in a haphazard manner in the rear area of the truck 7 on the loading area of the truck 7.

Since the vehicle chassis is resiliently disposed on the undercarriage by way of wheel suspensions, the additional load 13 results in a change of the loading condition, that is, in a change of the position of the vehicle chassis with respect to the undercarriage and thus also with respect to the road. Put differently, the vehicle chassis tilts by a roll angle α as well as by a pitch angle β (not shown) between the longitudinal axis of the chassis 14 and the road. This position of the vehicle chassis with respect to the road, which is changed in comparison to the empty condition of the vehicle results in a corresponding change of the distance of the scanning units 9, 10, 11, 12 from a respective road section 9", 10", 11", 12". Since the scanning system 8 (illustrated in FIGS. 2 and 3) contains four scanning units 9, 10, 11, 12, it is possible to determine the vehicle's loading condition via the analyzing unit (not shown) using the supplied distance measuring data as well as additional data. The additional data, in this case, is the geometry of the vehicle and optionally the vehicle speed.

In the present embodiment of the invention according to FIG. 2, four scanning units 9, 10, 11, 12 are provided which generally furnish a more precise measured result than a simpler embodiment containing a minimum number of three scanning units. This also reduces the influence of significant uneven road conditions, which can impair the result of the analyzing unit.

Furthermore, this result obtained from the analysis performed by the scanning units 9, 10, 11, 12 is used by the analyzing unit for determining, as a function of the vehicle loading condition and the lateral movement condition of the vehicle, limit values for the speed and the acceleration of the vehicle. When these limit values are exceeded, optical, acoustic or haptic warning signals are emitted to the driver. Independently of exceeding the permissible speed or acceleration limit value, it is also provided to inform the driver about the loading condition (i.e., exceeding a limit value with respect to the vehicle's loading). Specifically, according to the respective requirement, this information is provided in the event of exceeding a permissible overall load and/or when the vehicle's loading is too one-sided. In addition, it is possible to transmit the information signals of the analyzing unit to a central engine control, which can automatically limit the engine power, the speed and/or the acceleration of the vehicle.

Figure 4:
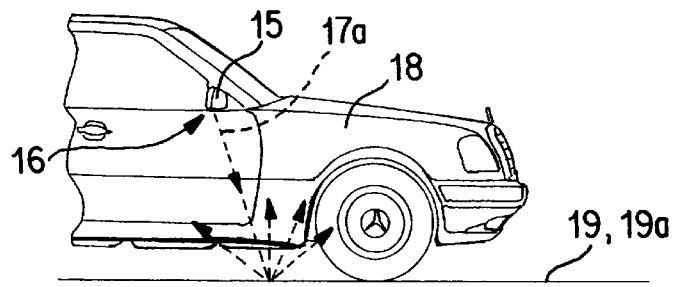
FIG. 4 is a lateral view of a forward portion of a passenger car with a scanning unit on an outside mirror which is suitable for determining the road condition, with an outlined representation of the reflection of an infrared light ray by a dry road.
Figure 5:
FIG. 5 is an outlined representation of the reflection of an IR-light ray by a wet road.
Figure 6:
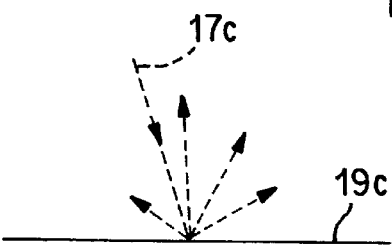
FIG. 6 is an outlined representation of the reflection of an IR-light ray by a snow-covered road.
Figure 7:
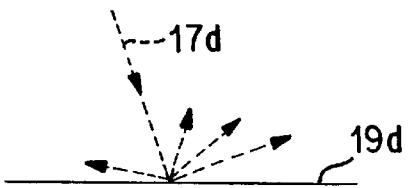
FIG. 7 is an outlined representation of the reflection of an IR-light ray by an icy road.
Figure 8:
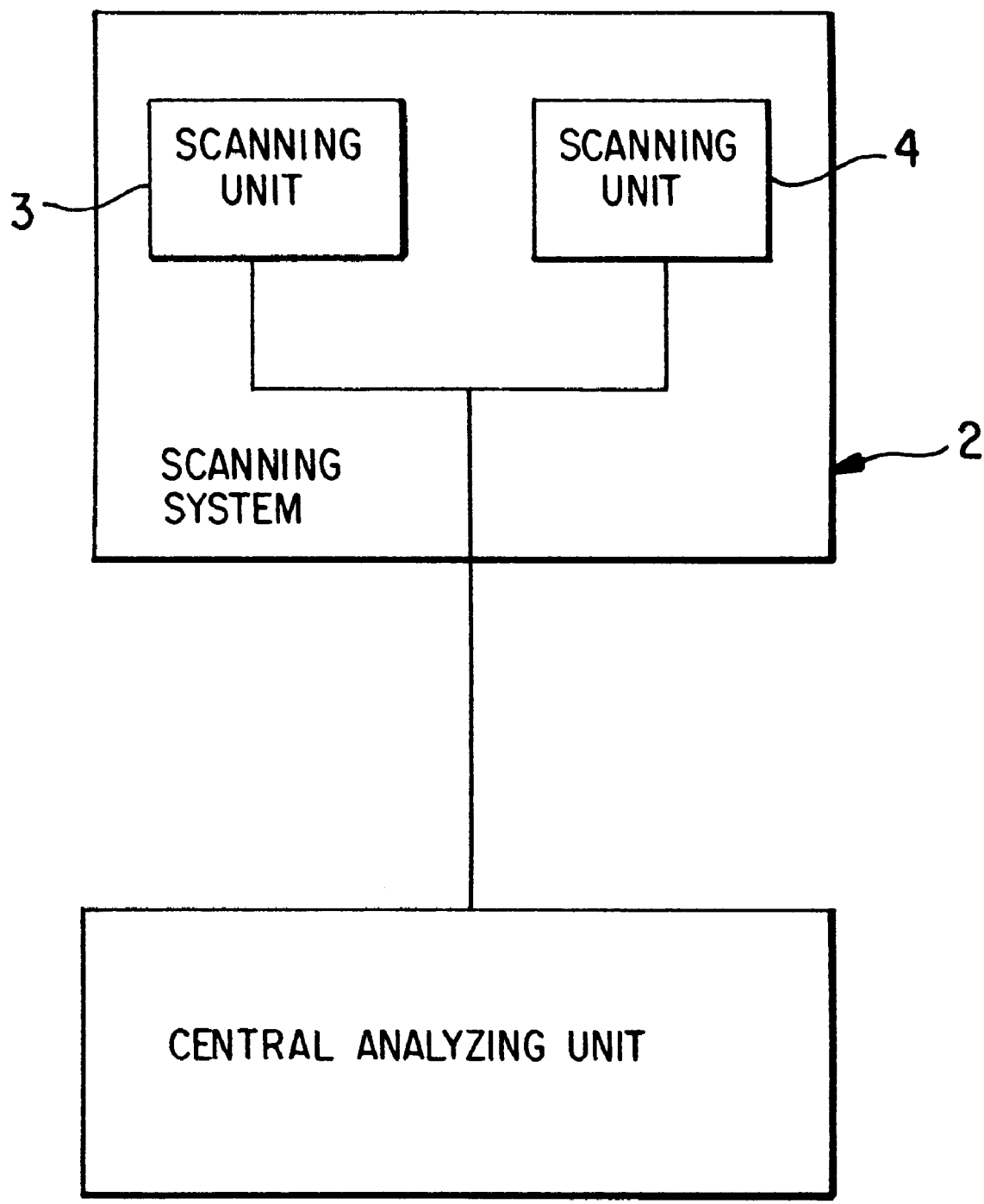
FIG. 8 is a schematic block diagram of an embodiment of the scanning system, according to the invention.

In another embodiment of the invention, a passenger car 18, as illustrated in FIG. 4, has a scanning system 16 which comprises an optical scanning unit 15 and an analyzing unit (not shown). The scanning unit 15 is integrated in the right outside mirror of the motor vehicle 18 and emits IR-light rays in the direction of the road surface 19. One emitted IR-light ray is schematically illustrated in FIG. 4 as a broken line 17a. The emitted IR-light ray 17a impinges on a dry road surface 19a and is reflected or scattered by the surface (as illustrated by broken arrows in FIG. 4). Since different road conditions, such as a wet, snow-covered, icy, dirty or dry road condition, result in different reflection characteristics of the road surface, it is possible to draw a conclusion regarding the condition of the road based on the respective backscattered or reflected light of the IR-light ray bundle (as illustrated in FIGS. 4 to 7). These figures in each case show, as an example, an IR-light ray 17a, 17b, 17c, 17d which is emitted by the scanning system by way of its scanning unit 15. In FIG. 4, this ray is backscattered by a dry road 19a; in FIG. 5, it is backscattered by a wet road 19b; in FIG. 6, it is backscattered by a snow-covered road 19c; and in FIG. 7, it is backscattered by an icy road 19d. A portion of the backscattered IR-light rays impinge on the scanning unit 15 which transmits information concerning the intensity of the received IR-light to the analyzing unit.

By using a regular arrangement of several IR-light transmitting elements and a respective receiver (for example, a CCD-array in the scanning unit 15), the intensities and the intensity differences of the back-scattered IR-light rays can be reliably detected. As a result, the analyzing unit is permitted to determine, via a contrast analysis, the reflection characteristics and the texture of the road surface 19. Using knowledge of the road texture, a parameter is detected which is relevant to the handling of the vehicle. Simply put, the texture provides information as to what friction conditions exist between the road and the vehicle tires.

The analyzing unit therefore obtains information concerning the road condition which it emits as warning and/or information signals to the driver of the vehicle, or as a function thereof, the analyzing unit determines speed and acceleration limit values. If these limit values are exceeded, the analyzing unit again emits warning signals to the driver or control signals to a central engine or driving-dynamics control unit which subsequently affects the operation of the motor vehicle in a limiting manner.

Optionally, conclusions can also be drawn from the detected texture on the lateral edge of the road and/or on the presence of driving lane markings, because a differentiation is possible not only between road surfaces changed as the result of the weather but also between different types of bases, such as asphalt, grass, gravel, soil, etc.

Ideally, a vehicle has a scanning system with the characteristics of all three illustrated embodiments, so that roll-over-angle-related, roll-over-moment-related, vehicle-load-related and road-condition-related data can be processed in the analyzing unit. From this combined analysis, in a vehicle according to the invention, exact data concerning the driving dynamics can be detected and limit values with respect to the driving dynamics can be generated. In addition to data filtering, a determination of a time average of data detected for an extended time period and/or a determination of an average value of the data detected by several scanning units, permits increased accuracy during the analysis of the measured data.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle apparatus, comprising:
   a scanning system mounted on the vehicle for zero contact scanning of at least one mutually spaced road area; and
   an analyzing system operatively coupled to the scanning system;
   wherein said analyzing system determines a vehicle roll angle and a vehicle load condition as a function of measured data detected and supplied by the scanning system.

2. The vehicle apparatus according to claim 1, wherein:
   said scanning system comprises two scanning units for detecting data related to roll angle and roll-over moment of the vehicle; and
   one of said scanning units is arranged in a left vehicle side area, and the other scanning unit is arranged in a right vehicle side area.

3. The vehicle apparatus according to claim 2, wherein said scanning system comprises at least three scanning units which are arranged along different axes.

4. The vehicle apparatus according to claim 1, wherein said scanning system comprises at least one optical scanning unit.

5. The vehicle apparatus according to claim 4, wherein the at least one optical scanning unit has a line of IR-light transmitting elements and a light sensor comprising one of a CCD-array and a line of photosensitive diodes.

6. The vehicle apparatus according to claim 1, wherein said scanning system comprises:
   a plurality of scanning units mounted on the vehicle.

7. The vehicle apparatus according to claim 6, comprising two scanning units, each for detecting data related to roll angle and roll-over moment of the vehicle;
   wherein one of said scanning units is arranged in a left vehicle side area, and the other scanning unit is arranged in a right vehicle side area.

8. The vehicle apparatus according to claim 6, comprising:
   at least three scanning units which are arranged along different axes.

9. The vehicle apparatus according to claim 7, comprising:
   at least three scanning units which are arranged along different axes.

10. The vehicle apparatus according to claim 6, wherein:
    the analyzing unit determines limit values for at least one of speed and acceleration of the vehicle, as a function of at least one of a determined vehicle roll angle, a roll-over moment which acts on the vehicle, vehicle loading condition and road condition; and
    when at least one of the limit values are exceeded, the analyzing unit emits corresponding information signals.

11. The vehicle apparatus according to claim 6, comprising:
    at least one optical scanning unit.

12. The vehicle apparatus according to claim 11, wherein the at least one optical scanning unit has a line of IR-light transmitting elements and a light sensor comprising one of a CCD-array and a line of photosensitive diodes.

13. A vehicle apparatus, comprising:
    a scanning system mounted on the vehicle for zero contact scanning of at least one mutually spaced road area; and
    an analyzing system operatively coupled to the scanning system;
    wherein said analyzing system determines a vehicle roll angle and a vehicle load condition as a function of measured data detected and supplied by the scanning system; and
    wherein said scanning system comprises only three scanning units which are arranged along different axes.

14. A vehicle apparatus, comprising:
    a scanning system mounted on the vehicle for zero contact scanning of at least one mutually spaced road area; and
    an analyzing system operatively coupled to the scanning system;
    wherein said analyzing system determines a vehicle roll angle and a vehicle load condition as a function of measured data detected and supplied by the scanning system;
    wherein the analyzing unit determines limit values for at least one of speed and acceleration of the vehicle, as a function of at least one of a determined roll angle, a roll-over moment which acts on the vehicle, vehicle loading condition and road condition; and
    wherein, when at least one of the limit values are exceeded, the analyzing unit emits corresponding information signals.

15. A method of scanning a vehicle road surface, comprising the steps of:
    scanning a plurality of mutually spaced areas of a vehicle supporting surface adjacent the vehicle with a scanning unit;
    generating signals indicative of a distance to each scanned area; and
    providing said signals to an analyzing unit for calculating at least one of a roll-over angle, a roll-over moment which acts on the vehicle, and a vehicle load condition based on measured data detected and supplied by the scanning system.

16. A device for determining vehicle operating parameters, comprising:
    a plurality of distance sensors mounted on said vehicle, and arranged for sensing mutually spaced areas of a surface which supports said vehicle, each particular sensor of said plurality generating a signal indicative of at least a distance to said surface in one of said spaced areas which is sensed by said particular sensor;

an analyzing system coupled to receive signals generated by said sensors; and calculating means included in said analyzing system for calculating one of a roll-angle, a roll-over moment and a vehicle load condition of said vehicle as a function of distance information contained in said signals.

* * * * *